US009514020B2

(12) United States Patent
Tonry et al.

(10) Patent No.: US 9,514,020 B2
(45) Date of Patent: Dec. 6, 2016

(54) POWER PROFILE DIAGNOSTIC SYSTEM

(71) Applicant: Dell Products L.P., Round Rock, TX (US)

(72) Inventors: Richard Martin Tonry, Austin, TX (US); Nikolai V. Vyssotski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 242 days.

(21) Appl. No.: 14/312,036

(22) Filed: Jun. 23, 2014

(65) Prior Publication Data

US 2015/0370681 A1 Dec. 24, 2015

(51) Int. Cl.
  *G06F 1/26* (2006.01)
  *G06F 11/30* (2006.01)
  *G06F 11/32* (2006.01)
  *G06F 11/07* (2006.01)
  *G06F 11/22* (2006.01)
  *G06F 11/24* (2006.01)

(52) U.S. Cl.
  CPC ........... *G06F 11/3062* (2013.01); *G06F 11/07* (2013.01); *G06F 11/2284* (2013.01); *G06F 11/24* (2013.01); *G06F 11/321* (2013.01); *Y02B 60/165* (2013.01)

(58) Field of Classification Search
  CPC ...... G06F 1/26; G06F 11/3062; G06F 11/321; G06F 11/0766; G06F 11/3065
  USPC .......... 713/300, 340; 714/22, 25; 702/58, 60
  See application file for complete search history.

(56) References Cited

U.S. PATENT DOCUMENTS

| | | | | |
|---|---|---|---|---|
| 7,130,719 B2 * | 10/2006 | Ehlers | .................. | F24F 11/0012 700/276 |
| 8,370,650 B2 * | 2/2013 | Paniagua, Jr. | ............ | G06F 1/26 320/114 |
| 2005/0116836 A1 * | 6/2005 | Perry | ....................... | H04Q 9/00 340/870.02 |
| 2012/0259476 A1 * | 10/2012 | Trieb | ....................... | G06F 1/28 700/295 |
| 2013/0116846 A1 * | 5/2013 | Galsim | .................. | G06F 1/266 700/295 |
| 2014/0223214 A1 * | 8/2014 | Nabhane | ................. | G05F 1/625 713/324 |

\* cited by examiner

*Primary Examiner* — Chun Cao
(74) *Attorney, Agent, or Firm* — Haynes and Boone, LLP (57) ABSTRACT

A power profile diagnostic system includes a power rail. At least one subsystem is coupled to the power rail. A controller is coupled to the power rail and to a power profile database. The controller is configured to monitor the power rail and determine a power consumption profile of the at least one subsystem during a predefined operation of the at least one subsystem. The controller then compares the power consumption profile to a predetermined power profile that is stored in the power profile database in association with the predefined operation, and determines whether a difference between the predetermined power profile and the power consumption profile is indicative of a malfunction of the at least one subsystem. If the difference between the predetermined power profile and the power consumption profile is indicative of the malfunction of the at least one subsystem, the controller provide a malfunction report for display.

20 Claims, 5 Drawing Sheets

POWER PROFILE DIAGNOSTIC SYSTEM

BACKGROUND

The present disclosure relates generally to information handling systems, and more particularly to a diagnostic system for information handling systems using power profiles.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, laptop/notebook IHSs, tablet IHSs, and/or a variety of other IHSs known in the art, are often subject to service contracts provided by their manufacturers or other sellers of IHSs to service the IHS in the event of issues or problems with the IHS. The costs associated with providing such service increase when, for example, the issues or problems with the IHS are difficult to diagnose, when such diagnosis requires the user to send the IHS to the service provider or require the service provider to send the a technician to the users location, and/or due to a variety of other service scenarios known in the art. Furthermore, issues or problems with the IHS that become significant enough to prevent proper operation of the IHS provide a negative user experience. Conventional solutions to such issues include providing self-diagnostic capabilities in the IHS such that diagnosis of the issues or problems may occur prior to those issues or problems preventing proper operation of the IHS, and allowing for diagnosis of issues or problems with the IHS without the need for the user to send the IHS to the service provider or requiring the service provider to send a technician to the users location. However, the provision of conventional self-diagnostic capabilities in an IHS typically includes providing additional physical hardware in the IHS such as, for example, loop-back pins, additional general purpose input/outputs (GPIOs), and/or a variety of other self-diagnostic capability components known in the art. Such additional physical hardware increases the cost of what may be already low-margin IHSs.

Accordingly, it would be desirable to provide an improved self-diagnostic system.

SUMMARY

According to one embodiment, an information handling system (IHS) includes a plurality of IHS components; a processing system that is coupled to each of the plurality of IHS components; and a memory system that is coupled to the processing system and that includes instructions that, when executed by the processing system, cause the processing system to provide a power profile diagnostic engine that is configured to: determine a power consumption profile of at least one of a plurality of IHS components during a predefined operation of the at least one of the plurality of IHS components; compare the power consumption profile to a predetermined power profile that is stored in the memory system in association with the predefined operation; determine that a difference between the predetermined power profile and the power consumption profile is indicative of a malfunction of the at least one of the plurality of IHS components; and provide a malfunction report for display in response to determining that the difference between the predetermined power profile and the power consumption profile is indicative of the malfunction of the at least one of the plurality of IHS components.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
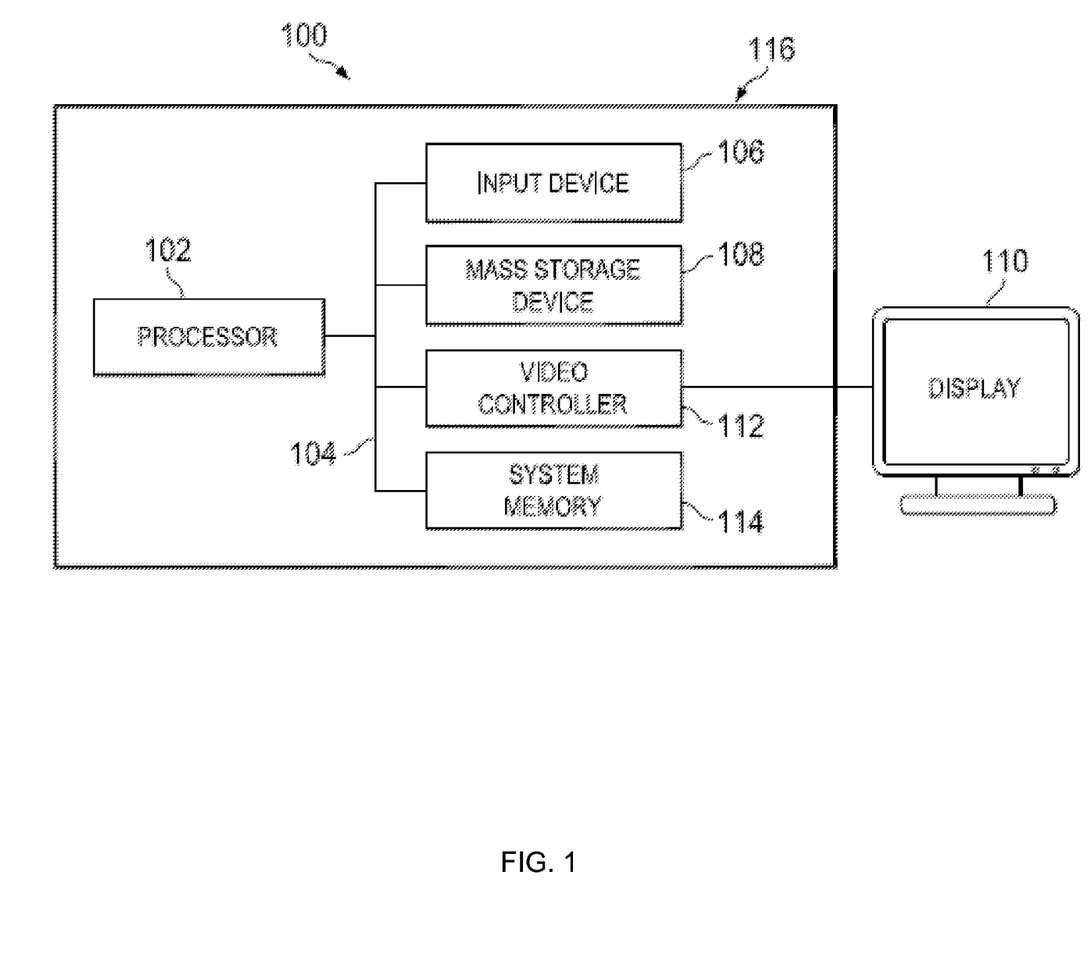
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
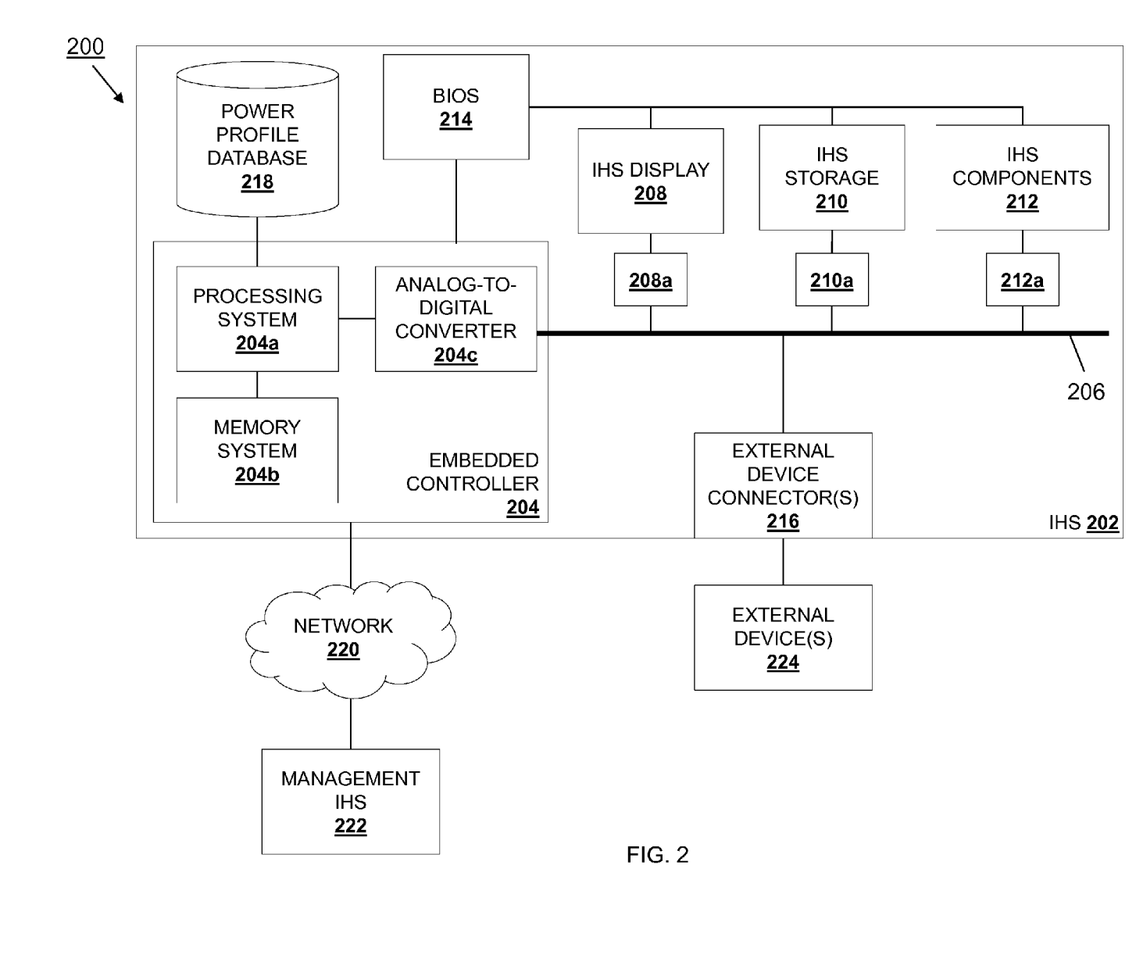
FIG. 2 is a schematic view illustrating an embodiment of a power profile diagnostic system.

Referring now to FIG. 2, an embodiment of a power profile diagnostic system 200 is illustrated that includes an IHS 202, which may be the IHS 100 discussed above with reference to FIG. 1 and/or include some or all of the IHS components in the IHS. For example, the IHS 202 may be a laptop/notebook IHS, a tablet IHS, a phone IHS, a desktop IHS, a server IHS, a storage IHS, and/or a variety of other IHSs known in the art. The illustrated embodiment of the IHS 202 includes an embedded controller 204 having a processing system 204a that is coupled to a memory system 204b. The memory system 204b may include instruction that, when executed by the processing system 204a, cause the processing system 204a to provide a power profile diagnostic engine that is configured to perform the functions of the power profile diagnostic engines, embedded controllers, and/or processing systems discussed below. While the processing system 204a and the memory system 204b are illustrated as being included in the embedded controller 204, other processing systems (e.g., the processor 102 discussed above with reference to FIG. 1) and memory systems (e.g., the system memory 114 discussed above with reference to FIG. 1) that are not part of an embedded controller may provide the power profile diagnostic engines discussed below while remaining within the scope of the present disclosure. The illustrated embodiment of the embedded controller 204 also includes an analog-to-digital converter 204c that is coupled to the processing system 204a and a power rail 206 that is included in the IHS 202. As discussed below, the analog-to-digital converter 204c may be configured to monitor power drawn through the power rail 206. However, a variety of components and/or devices that are known in the art (e.g., other than analog-to-digital converters) may be used to monitor power drawn in the manners discussed below while remaining within the scope of the present disclosure.

The IHS 202 also includes a plurality of IHS subsystems including, in the illustrated embodiment, an IHS display 208, an IHS storage 210, and a plurality of other IHS components 212. In the illustrated embodiment, each of the IHS display 208, the IHS storage 210, and the plurality of other IHS components 212 may be coupled to the power rail 206 by power regulators 208a, 210a, and 212a, respectively. However, one of skill in the art in possession of the present disclosure will recognize that IHS subsystems may be coupled to a power rail in a variety of other manners while remaining within the scope of the present disclosure. A Basic Input/Output System (BIOS) 214 is coupled to the embedded controller 204 and to each of the IHS display 208, the IHS storage 210, and the plurality of other IHS components 212. One or more external device connectors 216 such as, for example, Universal Serial Bus (USB) connectors, High-Definition Multimedia (HDMI) connectors, and/or a variety of other external device connectors known in the art, are coupled to the power rail 206.

The IHS 202 also includes a power profile database 218 that is coupled to the processing system 204a in the embedded controller 204. As discussed in further detail below, the power profile database 218 may store one or more predetermined power profiles for one or more of the IHS subsystems (e.g., the IHS display 208, the IHS storage 210, and/or the other IHS components 212) in the IHS 202. In some embodiments, the one or more predetermined power profiles may be generated during the manufacture of the IHS 202 and stored in the power profile database 218. In other embodiments, the one or more predetermined power profiles may be generated subsequent to the provision of the IHS 202 to a user and stored in the power profile database 218. In yet other embodiments, the one or more predetermined power profiles may be generated subsequent to the replacement of one or more IHS subsystems in the IHS 202 and stored in the power profile database 218. While a few examples have been provided, the generation and storage of the one or more predetermined power profiles in the power profile database 218 may occur at a variety of times and/or in response to a variety of actions while remaining within the scope of the present disclosure.

In some embodiments, the one or more predetermined power profiles stored in the power profile database 218 may include a predetermined power profile for the operation of all of the IHS subsystems in the IHS 202. In other embodiments, the one or more predetermined power profiles stored in the power profile database 218 may include a predetermined power profile for the operation of a single IHS subsystem in the IHS 202. In yet other embodiments, the one or more predetermined power profiles may include a predetermined power profile for the operation of any number and/or combination of IHS subsystems in the IHS 202. The one or more predetermined power profiles may include a predetermined power profile that has been normalized for the IHS 202 and/or IHS subsystem(s) for which that predetermined power profile was generated. In an embodiment, normalization of a predetermined power profile may be performed as part of an IHS factory build process or during an IHS service procedure. For example, at the last step of IHS manufacture and before the IHS is boxed for shipment, or during a factor authorized service procedure, the IHS may undergo a series of tests for each system component in the IHS that result in the predetermined power profiles that are then stored in the IHS. In some embodiments, a predetermined power profile may be generating during a predefined operation of the IHS and/or IHS subsystem(s), and that predetermined power profile may then be stored in the power profile database 218 in association with that predefined operation. For example, a predetermined power profile may be generated during a predefined operation associated with an IHS boot process such as, for example, the initialization, testing, and/or other operations associated with one or more IHS subsystems during the Power-On Self-Test (POST) portion of the IHS boot process, and that predetermined power profile may then be stored in the power profile database 218 in association with that predefined operation.

As such, in some embodiments, a predetermined power profile may be generated for all of the IHS subsystem in the IHS 202 by monitoring the power rail 206 during the POST portion of the IHS boot process to determine a power draw through the power rail 206 over time by the IHS 202, and that predetermined power profile is then stored in the power profile database 218 in association with that predefined operation. Similarly, a predetermined power profile may be generated for each respective IHS subsystem in the IHS 202 by monitoring the power rail 206 (or the power regulator for that IHS subsystem) during the POST portion of the IHS boot process to determine a power draw over time for each of those IHS subsystems, and those predetermined power profiles are then saved in the power profile database 218 in association with the predefined operation(s). As discussed above, predetermined power profiles may be generated for any combination of IHS subsystems in the IHS 202 in a similar manner. Furthermore, as discussed above, predetermined power profiles may be generated in response to any new IHS subsystems being added to the IHS 202 (or being used to replace old IHS subsystem in the IHS 202) in a similar manner as well.

Figure 3:
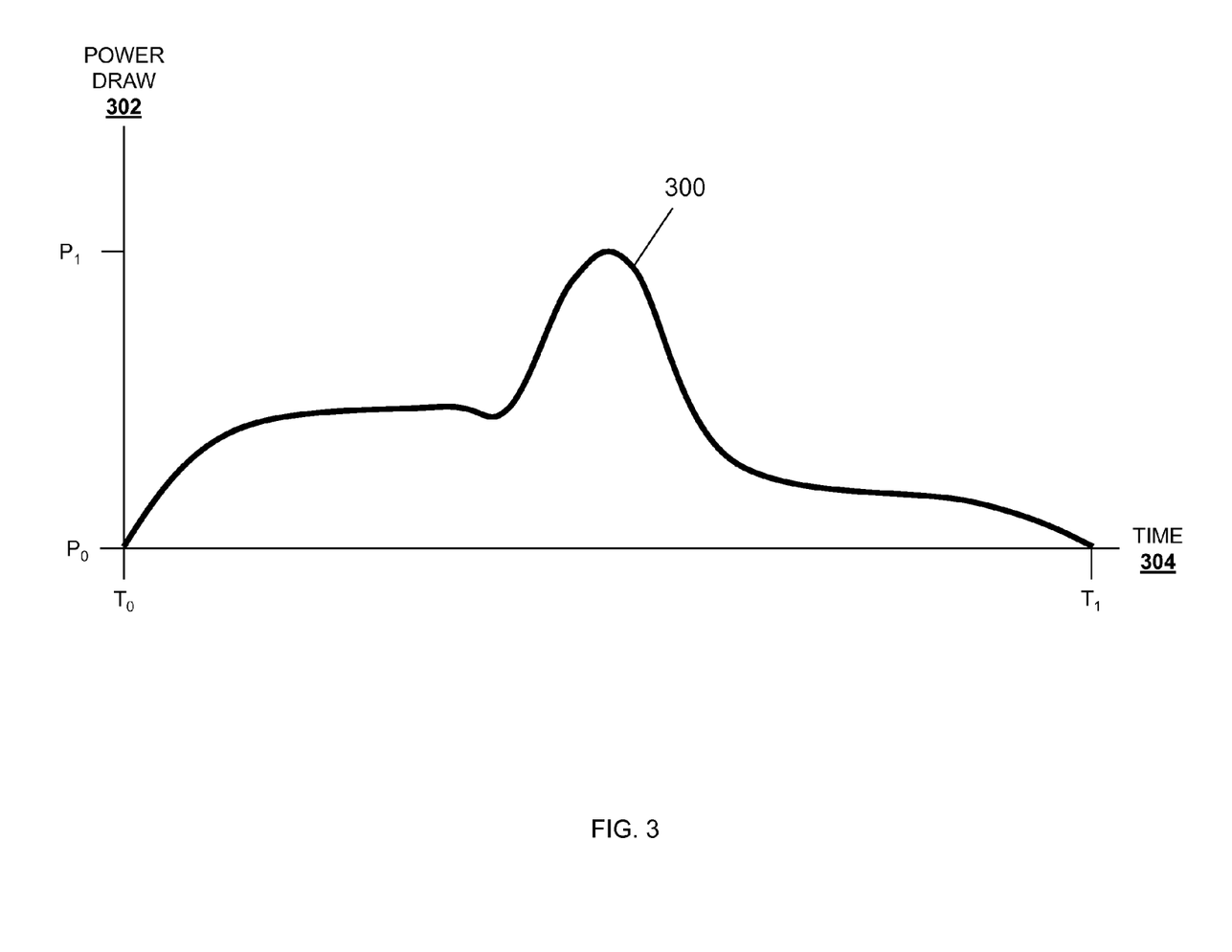
FIG. 3 is a chart illustrating an embodiment of a predetermined power profile.

Referring now to FIG. 3, a chart 300 that graphically illustrates an embodiment of a predetermined power profile 300 is provided, with the predetermined power profile 300 plotted using power draw 302 (e.g., through a power rail 206, through a power regulator, etc.) on the Y-axis and time 304 on the X-axis. The predetermined power profile 300 illustrates how the power drawn over time may vary between a power $P_0$ and power $P_1$ during a predefined operation that occurs between time $T_0$ and time $T_1$. As discussed above, the predetermined power profile 300 illustrated in FIG. 3 may be for the operation of all the IHS subsystems in the IHS 202, a single IHS subsystem in the IHS 202, or any number and/or combination of IHS subsystems in the IHS 202.

In the illustrated embodiment, the embedded controller 204 is coupled to a network 220 (e.g., via a communication system (not illustrated) in the IHS 202) that is further coupled to a management IHS 222. In addition, one or more external devices 224 may be coupled to the IHS 202 through respective external device connectors 216. While a specific example of the power profile diagnostic system 200 has been illustrated and described, one of skill in the art in possession of the present disclosure will recognize that a wide variety of IHSs and IHS subsystems will benefit from the teachings of the present disclosure and thus will fall within its scope.

Figure 4:
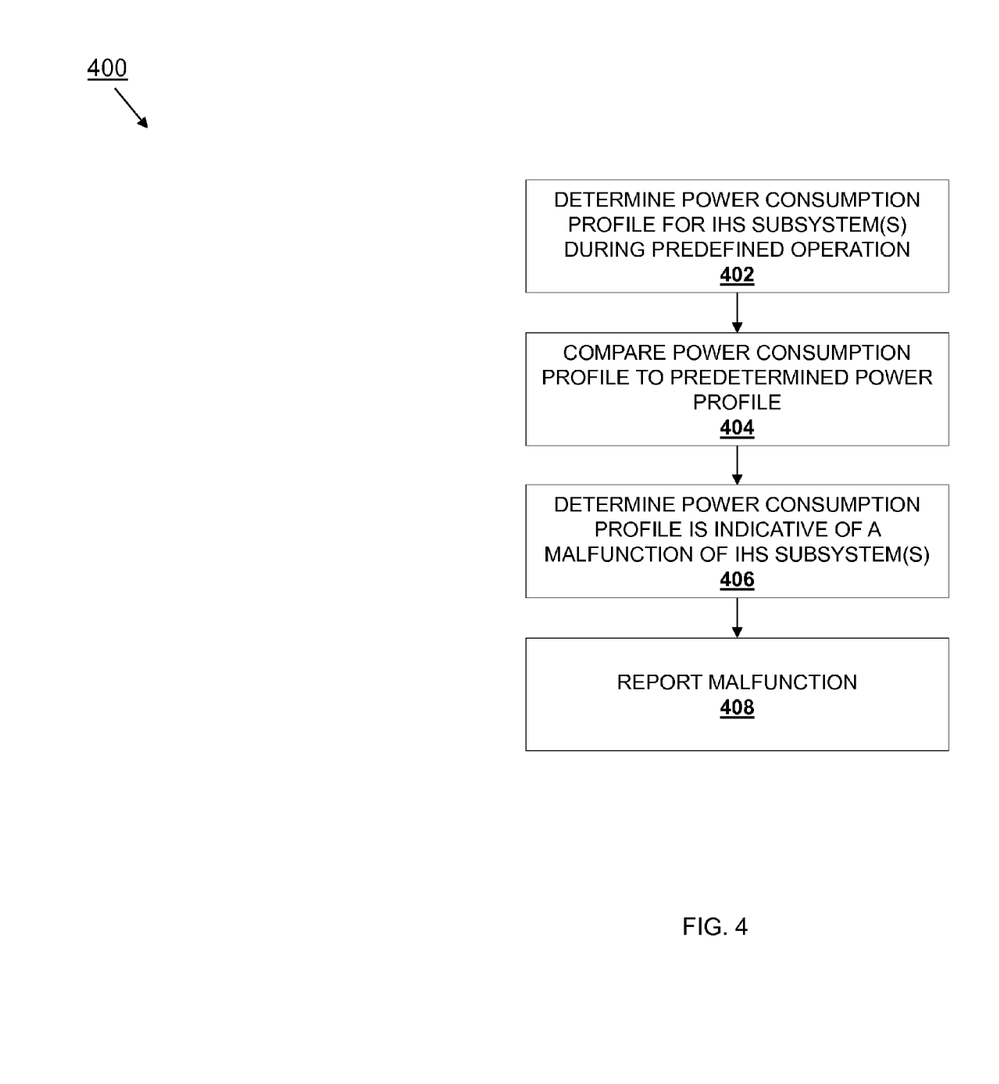
FIG. 4 is a flow chart illustrating an embodiment of a method for diagnosing an IHS using power profiles.

Referring now to FIGS. 2 and 4, an embodiment of a method 400 of diagnosis using power profiles is illustrated. In the embodiment of the method 400 discussed below, the predefined operations that are used to determined power consumption profiles are performed during an IHS boot process and, specifically, during a POST portion of the IHS boot process. However, as noted below, predefined operations that are used to determine power consumption profiles may be performed during other portions of the IHS boot process, during runtime of the IHS, during shutdown of the IHS, and/or at any other time while remaining within the scope of the present disclosure. The method 400 begins at block 402 where a power consumption profile for one or more IHS subsystems is determined during a predefined operation. As discussed above, the power profile database 218 stores one or more predetermined power profiles that may be associated with predefined operations, and as discussed below, a power consumption profile may be determined during a predefined operation and compared to the predetermined power profile associated with that predefined operation in order to determine whether a malfunction may be present in an IHS subsystem. As such, the predefined operation during which the power consumption profile is determined at block 402 of the method 400 may be selected, conducted, or otherwise carried out based on the one or more IHS subsystems for which a predetermined power profile exists, or for which a diagnostic test is to be conducted.

In some embodiments, the determination of the power consumption profile at block 402 of the method 400 may be performed automatically such as, for example, in response to the performance of the predefined operation (i.e., when the IHS subsystem(s) perform the predefined operation in the course of IHS operation and without instruction from a user). In other embodiments, the determination of the power consumption profile at block 402 of the method 400 may be performed in response to an instruction from, for example, a user of the IHS 202, the management IHS 222, and/or some other entity wishing to perform a diagnostic test on the IHS 202 on one or more of its subsystems.

In a specific embodiment of block 402, the predefined operation is performed during an IHS boot process and involves the BIOS 214 communicating with one or more of the IHS subsystems (e.g., the IHS display 208, the IHS storage 210, and/or the other IHS components 212) to cause the one or more IHS subsystems to perform the predefined operation. For example, at block 402 the BIOS 214 may operate during a POST portion of the IHS boot process to cause the one or more IHS subsystems to initialize, test, and/or perform other operations associated with the POST portion of the IHS boot process. In some embodiments, the POST portion of the IHS boot process may involve a sequence of operations in which each IHS subsystem in the IHS 202 is separately initialized, tested, and/or otherwise performs POST-related operations. As such, during the POST portion of the IHS boot process, a power consumption profile may be determined for each IHS subsystem according to the POST sequence (i.e., each initialization, testing, and/or POST related operation in the POST sequence may be a predefined operation associated with a predetermined power profile in the power profile database 218). One of skill in the art in possession of the present disclosure will recognize that the use of POST-related operations as the predefined operation for which a power consumption profile is determined may allow for power consumption profile to be determined for each individual IHS subsystem due to the separate initialization, testing, and/or other POST related operations that are conducted during the POST sequence for each individual IHS subsystem.

At block 402, the BIOS 214 may operate to communicate to the power profile diagnostic engine in the embedded controller 204 that a predefined operation is occurring. In some embodiments of block 402, the analog-to-digital converter 204c may operate to monitor the power rail 206 and report the power draw through the power rail 206 to the power profile diagnostic engine. The power profile diagnostic engine may then use the communications from the BIOS 214 about the predefined operation(s) and the reporting of the power draw through the power rail 206 from the analog-to-digital converter 204c to determine the power consumption profile. For example, the power profile diagnostic engine may determine a power consumption profile that includes the power draw through the power rail over time during the predefined operation. In other embodiments of block 402, the analog-to-digital converter 204c (or other power consumption monitoring device) may operate to monitor the one or more power regulators (e.g., the regulators 208a, 210a, and/or 212a) that regulate power to the IHS subsystems and report the power draw through those one or more power regulators to the power profile diagnostic engine. The power profile diagnostic engine may then use the communications from the BIOS 214 about the predefined operation(s) and the reporting of the power draw through those one or more power regulators to determine the power consumption profile. For example, the power profile diagnostic engine may determine a power consumption profile that includes the power draw through a power regulator connected to a single IHS component over time during the predefined operation.

In some embodiments of block 402, the power profile diagnostic engine may operate to prevent power from being supplied through the power rail 206 to one or more IHS subsystems during the predefined operation. For example, a predefined power profile in the power profile database 218 may have been determined by a single IHS component performing the predefined operation by itself and without any other IHS subsystem (or only necessary IHS subsystems) drawing power from the power rail 206. As such, the power profile diagnostic engine may operate to prevent power from being supplied through the power rail 206 to other IHS subsystems during the predefined operation such that, during the predefined operation, only that single IHS subsystem (and IHS subsystems necessary to perform the predefined operation) are able to draw power from the power rail 206. In a specific example, the power profile diagnostic engine may prevent power from being supplied through the power rail 206 to the external device connectors 216 during the predefined operation such that any connected external devices 224 are unable to draw power through the power rail 206. As such, the power consumption profile determined at block 402 during the predefined operation may include power drawn through the power rail 206 by IHS subsystems that were enabled during the generation of the predetermined power profile associated with that predefined operation (e.g., a predetermined power profile generated during a predefined operation of the IHS subsystem(s) during the manufacture of the IHS may then be compared to a power consumption profile generated during the predefined operation of that IHS with user-connected external devices without any of those user-connected external devices contributing to that power consumption profile.)

In some embodiments, the power profile diagnostic engine may operate to provide one or more subsystem settings to one or more IHS subsystems for use during the predefined operation. For example, a predefined power profile in the power profile database 218 may have been determined with one or more IHS subsystems performing the predefined operation with particular IHS subsystem settings. As such, the power profile diagnostic engine may operate to provide those one or more subsystem settings to one or more IHS subsystems such that, during the predefined operation used to determine the power consumption profile, the one or more IHS subsystems operate at the same IHS subsystem settings that were used during the determination of the predetermined power profile. In a specific example, the power profile diagnostic engine may provide a particular brightness setting for the IHS display 208 during the predefined operation that is used to determine the power consumption profile, and that particular brightness setting will be the same as was used during the predetermined operation to determine the predetermined power profile. As such, the power consumption profile determined at block 402 during the predefined operation may include power drawn by the IHS display 208 operating at the same brightness that was used during the generation of the predetermined power profile associated with that predefined operation.

While not explicitly described herein, one of skill in the art will recognize how the techniques described above may be extended to determine a power consumption profile during IHS runtime or otherwise subsequent to the IHS boot process. For example, IHS subsystems such as the IHS display 208, the IHS storage 210, IHS fan subsystems, and/or other IHS subsystems may be involved in performing a predefined operation subsequent to the IHS boot process. In order to allow for the comparison of the power consumption profile, which results from the operation of the IHS subsystem(s) during that predefined operation, to a predetermined power profile that is associated with that predefined operation, any of those IHS subsystems may be prevented from being supplied power from the power rail 206, have their IHS subsystem settings set to particular levels, and/or the IHS 202 may be otherwise made to have the same characteristics that were present during the generation of the predetermined power profile that is associated with that predefined operation.

Figure 5:
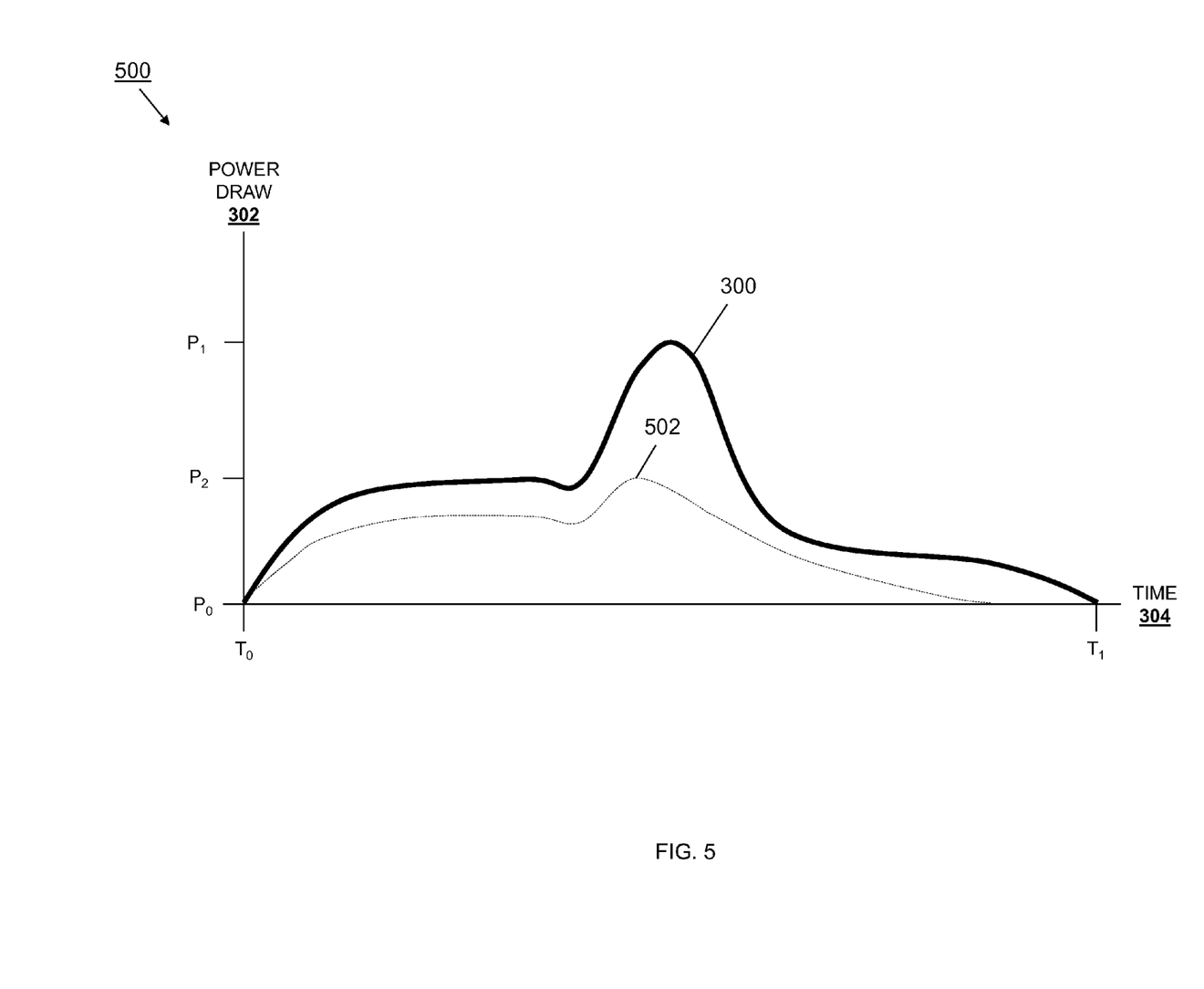
FIG. 5 is a chart illustrating an embodiment of the diagnosis of an IHS malfunction using the predetermined power profile of FIG. 3.

Referring now to FIGS. 2, 3, 4, and 5, the method 400 then proceeds to block 404 where the power consumption profile is compared to a predetermined power profile. In an embodiment, the power profile diagnostic engine compares the power consumption profile determined at block 402 during the predefined operation to the predetermined power profile in the power profile database 218 that is associated with that predefined operation. Referring now to FIG. 5, an embodiment of a power profile comparison 500 is illustrated. The power profile comparison 500 is graphically illustrated including the predetermined power profile 300, discussed above with reference to FIG. 3, plotted using the power draw 302 (e.g., through a power rail 206, through a power regulator, etc.) on the Y-Axis and time 304 on the X-Axis. The power profile comparison 500 also includes a power consumption profile 502 that is plotted using the power draw 302 (e.g., through a power rail 206, through a power regulator, etc.) on the Y-Axis and time 304 on the X-Axis. In the illustrated embodiment, the power consumption profile 502 illustrates how the power drawn over time may vary from a power $P_0$ to a power $P_2$ during the predefined operation that occurs between time $T_0$ and time $T_1$. As discussed above, the power consumption profile 502 illustrated in FIG. 5 may be determined for the same IHS subsystem(s) performing the same predefined operation as were used to generate the predefined power profile 300.

It has been discovered that changes in power consumption by IHS subsystems may occur when those IHS subsystems are experiencing a malfunction or are about to experience a malfunction. Furthermore, while the power profile comparison 500 of FIG. 5 illustrates a relatively large change in power consumption (e.g., the power consumption illustrated by the power consumption profile 502 relative to the predetermined power profile 300) for clarity of illustration and discussion, it has been found that relatively small variations in power consumption may be indicative of a malfunction or future malfunction of IHS subsystem(s). Thus, the comparison of the power consumption profile 502 with the predetermined power profile 300 by the power profile diagnostic engine may include the analysis of the power profile comparison 500 for any types of differences including, but not limited to, a minimum difference, a difference at a specific time or time period during the predefined operations, a shape difference (e.g., a difference in the shapes of the power consumption profile 502 relative to the predetermined power profile 300), a different in the area between the predetermined power profile curve and the power consumption profile curve, a standard deviation of a group of power consumption profiles, a direct percentage difference between a power consumption profile and a predetermined power profile, and/or a variety of other differences that may be indicative of a malfunction in IHS subsystem(s) and that will be apparent to one of skill in the art in possession of the present disclosure. In addition, each system component and/or subsystem may have a set of tolerances that may trigger thresholds specific to those system components and/or subsystems, and if a power consumption profile exceeds a threshold, that system component and/or subsystem may be flagged as having an issue or malfunction. Predetermined power profiles may be determined at a particular temperature, and power consumption profiles may be temperature-compensated to improve malfunction-determination accuracy in comparisons with those predetermined power profiles (which may have been determined with the IHS at a different temperature.) If the power consumption profile is not determined to be indicative of a malfunction in one or more IHS components, the method 400 may end or return to block 402 where another power consumption profile is determined.

The method 400 then proceeds to block 406 where it is determined that the power consumption profile is indicative of a malfunction of one or more IHS subsystems. In some embodiments, the power profile database 218 may include characteristics, definitions, and/or other information about different power consumption profiles that may be generated by the IHS subsystem(s) during the predefined operation that are indicative of a malfunction of the IHS subsystem(s). For example, a malfunctioning IHS display (e.g., an Liquid Crystal Display (LCD) with a malfunctioning backlight) will likely result in a reduced power consumption during a predefined operation relative to a fully functioning IHS display, and that reduced power consumption may be determined at block 406 as indicative of a malfunction of the IHS display. In examples where the IHS display is the only IHS subsystem (other than necessary IHS subsystems) performing the predefined operation, that reduced power consumption may be clearly indicative of the malfunction of the IHS display (and in some cases, specifically of the malfunctioning backlight). However, even in examples where the IHS display is one of a plurality of IHS subsystems performing the predefined operation (e.g., when all of the IHS subsystems perform the predefined operation), that reduced power consumption may provide a signature, reduced power amount, and/or other power consumption characteristic that is indicative of the malfunction of the IHS display.

Similarly, a malfunctioning IHS storage (e.g., a Hard Disk Drive (HDD) with malfunctioning bearings) will likely result in increased power consumption during a predefined operation relative to a fully functioning IHS storage (i.e., with correctly operating bearings), and that increased power consumption may be determined at block 406 to be indicative of a malfunction of the IHS storage. In examples where the IHS storage is the only IHS subsystem (other than necessary IHS subsystems) performing the predefined operation, that increased power consumption may be clearly indicative of the malfunction of the IHS storage (and in some cases, specifically of the malfunctioning bearings). However, even in examples where the IHS storage is one of a plurality of IHS subsystems performing the predefined operation (e.g., when all of the IHS subsystems perform the predefined operation), that reduced power consumption may provide a signature, increased power amount, and/or other power consumption characteristic that is indicative of the malfunction of the IHS storage.

Thus, the power profile database 218 may include a wide variety of data that allows the power profile diagnostic engine to determine not only that a malfunction is occurring or may occur in the near future, but possibly what type of malfunction is occurring or may occur. For example, a database of power consumption profiles that are generated by particular IHS subsystem(s) during particular predefined operations and that have been determined to be associated with the malfunction of particular IHS subsystem(s) may be provided to the power profile diagnostic system (e.g., by the management IHS 222) for reference, and may allow the power profile diagnostic engine to accurately determine which IHS subsystem may be malfunctioning or about to malfunction at block 406. Furthermore, the power profile diagnostic engine may be configured to take into account the variation in power consumption by IHS subsystems over the life of those IHS subsystems such that variations in power consumption due solely to IHS component age (rather than current or future malfunction) may be recognized. As such, the determination that a power consumption profile is indicative of a malfunction in an IHS subsystem may include the power profile diagnostic engine consulting a variety of information sources to analyze the differences between the power consumption profile 502 and the predetermined power profile 300 and determine what type of malfunction in the IHS subsystem(s) (and in some cases, the particular component(s) in the IHS subsystem(s)) that are responsible for those power consumption differences.

The method 400 then proceeds to block 408 where the malfunction is reported. In an embodiment of block 408, the power profile diagnostic engine operates to provide a malfunction report for display to a user of the IHS 202 by, for example, displaying a malfunction report on the IHS display 208. In another embodiment of block 408, the power profile diagnostic engine operates to provide a malfunction report for display to a user of the management IHS 222 by, for example, providing a malfunction report over the network 220 for display on the management IHS 222. In an embodiment, the malfunction report may include any details about the malfunction determined at block 406 and/or the differences between the power consumption profile and predetermined power profile that were used to determine that malfunction. For example, the malfunction report may include each IHS subsystem that performed the predefined operation, which IHS subsystem the malfunction appears to have occurred in, the component in the IHS subsystem that the malfunction appears to have occurred in, the power consumption difference that caused the malfunction to be determined, and/or any other detail used or determined at block 406. In some embodiments, the malfunction report may include a data backup recommendation that informs the user of the IHS 202 or the user of the management IHS 222 to back up the data on the IHS 202, or that automatically backs up the data on the IHS 202.

Thus, systems and methods have been described that provide for the diagnosis of malfunctions or possible malfunctions of one or more IHS subsystems based on the power consumption of the IHS subsystem(s) as compared to a predetermined power profile generated by the IHS subsystem(s) during the same predefined operation when those IHS subsystem(s) are operating normally. One of skill in the art in possession of the present disclosure will recognize that the system and methods of the present disclosure may be performed by a wide variety of IHSs without the need to provide additional diagnostic hardware in those IHSs, thus extending the diagnostic capabilities of IHSs utilizing only their existing hardware such that the cost of those IHSs is not increased. For example, the systems and methods described herein may be practiced by a wide variety of commercial laptop/notebook IHSs and tablet IHSs utilizing the hardware resources that are already present in those laptop/notebook IHSs and tablet IHSs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power profile diagnostic system, comprising:
a power rail;
a plurality of subsystems that are coupled to the power rail; and
a controller that is coupled to the power rail and to a power profile database, wherein the controller is configured to:
prevent power from being supplied through the power rail to a first subset of the plurality of subsystems while a second subset subsystem of the plurality of subsystems perform a predefined operation using power from the power rail;
monitor the power rail and determine a power consumption profile of the second subset of the plurality of subsystems during the predefined operation;
compare the power consumption profile to a predetermined power profile that is stored in the power profile database in association with the predefined operation;
determine that a difference between the predetermined power profile and the power consumption profile is indicative of a malfunction of the second subset of the plurality of subsystems; and
provide a malfunction report for display in response to determining that the difference between the predetermined power profile and the power consumption profile is indicative of the malfunction of the second subset of the plurality of subsystems.

2. The power profile diagnostic system of claim 1, further comprising:
at least one external device coupled to the power rail, wherein the controller is configured to:
prevent power from being supplied through the power rail to the at least one external device during the predefined operation.

3. The power profile diagnostic system of claim 1, wherein the predefined operation is performed during a boot process.

4. The power profile diagnostic system of claim 1, wherein the controller is configured to:
provide a data backup recommendation for display in response to determining that the difference between the predetermined power profile and the power consumption profile is indicative of the malfunction of the second subset of the plurality of subsystems.

5. The power profile diagnostic system of claim 1, further comprising:
an analog-to-digital converter that is included in the controller and that is configured to monitor the power rail such that the power consumption profile of the second subset of the plurality of subsystems may be determined while the second subset of the plurality of subsystems perform the predefined operation.

6. The power profile diagnostic system of claim 1, wherein the power consumption profile of the second subset of the plurality of subsystems includes a power consumption profile of at least two second subsystems that are connected to the power rail.

7. The power profile diagnostic system of claim 1, wherein the power consumption profile of the second subset of the plurality of subsystems includes a power consumption profile of a single second subsystem that is connected to the power rail.

8. An information handling system (IHS) comprising:
a plurality of IHS components;
a processing system that is coupled to each of the plurality of IHS components; and
a memory system that is coupled to the processing system and that includes instructions that, when executed by the processing system, cause the processing system to provide a power profile diagnostic engine that is configured to:
prevent power from being supplied to a first subset of the plurality of IHS components while a second subset of the plurality of IHS components perform a predefined operation that consumes;
determine a power consumption profile of the second subset of the plurality of IHS components during the predefined operation;
compare the power consumption profile to a predetermined power profile that is stored in the memory system in association with the predefined operation;
determine that a difference between the predetermined power profile and the power consumption profile is indicative of a malfunction of the second subset of the plurality of IHS components; and
provide a malfunction report for display in response to determining that the difference between the predetermined power profile and the power consumption profile is indicative of the malfunction of the second subset of the plurality of IHS components.

9. The IHS of claim 8, further comprising:
at least one external device coupled to the processing system, wherein the power profile diagnostic engine is configured to:
prevent power from being supplied to the at least one external device during the predefined operation.

10. The IHS of claim 8, wherein the predefined operation is performed during an IHS boot process.

11. The HS of claim 8, wherein the power profile diagnostic engine is configured to:
provide a data backup recommendation for display in response to determining that the difference between the predetermined power profile and the power consumption profile is indicative of the malfunction of the second subset of the plurality of IHS components.

12. The IHS of claim 8, further comprising:
a power rail that is coupled to each of the plurality of IHS components; and
an analog-to-digital converter that is configured to monitor the power rail such that the power consumption profile of the second subset of the plurality of IHS components may be determined while the second subset of the plurality of IHS components perform the predefined operation.

13. The IHS of claim 8, wherein the power consumption profile of the second subset of the plurality of IHS components includes a power consumption profile of at least two of the plurality of IHS components.

14. The IHS of claim 8, wherein the power consumption profile of the second subset of the plurality of IHS components includes a power consumption profile of a single IHS component.

15. A method for diagnosis using power profiles, comprising:
preventing, by a controller, power from being supplied to a first subset of a plurality of IHS components while a second subset of the plurality of IHS components perform a predefined operation that consumes power;

determining, by the controller, a power consumption profile of the second subset of the plurality of IHS components during the predefined operation;

comparing, by the controller, the power consumption profile to a predetermined power profile that is stored in a database in association with the predefined operation;

determining, by the controller, that a difference between the predetermined power profile and the power consumption profile is indicative of a malfunction of the second subset of the plurality of IHS components; and providing, by the controller, a malfunction report for display in response to determining that the difference between the predetermined power profile and the power consumption profile is indicative of the malfunction of the second subset of the plurality of IHS components.

16. The method of claim 15, further comprising:

preventing, by the controller, power from being supplied to the at least one external device during the predefined operation.

17. The method of claim 15, wherein the predefined operation is performed during an IHS boot process.

18. The method of claim 15, further comprising:

providing, by the controller, a data backup recommendation for display in response to determining that the difference between the predetermined power profile and the power consumption profile is indicative of the malfunction of the second subset of the plurality of IHS components.

19. The method of claim 15, wherein the power consumption profile of the second subset of the plurality of IHS components includes a power consumption profile of at least two of the plurality of IHS components.

20. The method of claim 15, wherein the power consumption profile of the second subset of the plurality of IHS components includes a power consumption profile of a single HS component.

* * * * *